United States Patent
Tokunaga et al.

(10) Patent No.: US 10,449,897 B2
(45) Date of Patent: Oct. 22, 2019

(54) CUP HOLDER

(71) Applicant: TOYODA GOSEI CO., LTD., Kiyosu-shi (JP)

(72) Inventors: Yoko Tokunaga, Kiyosu (JP); Naoto Nishimura, Kiyosu (JP); Yukihiko Umeda, Kiyosu (JP)

(73) Assignee: TOYODA GOSEI CO., LTD., Kiyosu-Shi, Aichi-Ken (JP)

( * ) Notice: Subject to any disclaimer, the term of this patent is extended or adjusted under 35 U.S.C. 154(b) by 0 days.

(21) Appl. No.: 16/019,138

(22) Filed: Jun. 26, 2018

(65) Prior Publication Data
US 2019/0084475 A1 Mar. 21, 2019

(30) Foreign Application Priority Data

Sep. 19, 2017 (JP) ................................ 2017-179445
Jan. 31, 2018 (JP) ................................ 2018-015502

(51) Int. Cl.
| | |
|---|---|
| *B60Q 3/66* | (2017.01) |
| *B60Q 3/64* | (2017.01) |
| *B60N 3/10* | (2006.01) |
| *B60Q 3/225* | (2017.01) |
| *B60Q 3/20* | (2017.01) |

(52) U.S. Cl.
CPC .............. *B60Q 3/66* (2017.02); *B60N 3/101* (2013.01); *B60N 3/105* (2013.01); *B60Q 3/20* (2017.02); *B60Q 3/225* (2017.02); *B60Q 3/64* (2017.02)

(58) Field of Classification Search
CPC ....................................................... B60Q 3/66
See application file for complete search history.

(56) References Cited

U.S. PATENT DOCUMENTS

| | | | | |
|---|---|---|---|---|
| 4,446,508 A | * | 5/1984 | Kinzie ................... | B60N 3/101 362/101 |
| 7,229,196 B2 | * | 6/2007 | Hulse ................. | G02B 19/0071 362/23.01 |
| 2015/0043209 A1 | * | 2/2015 | Nirenberg .............. | A01K 97/10 362/249.06 |
| 2016/0023594 A1 | * | 1/2016 | Salter ................. | H05B 37/0227 315/153 |
| 2016/0046233 A1 | | 2/2016 | Hansen et al. | |
| 2018/0079357 A1 | * | 3/2018 | Kikuchi ................... | B60N 3/00 |

FOREIGN PATENT DOCUMENTS

JP 2015-229455 A 12/2015

* cited by examiner

*Primary Examiner* — Sharon E Payne
(74) *Attorney, Agent, or Firm* — McGinn I.P. Law Group, PLLC.

(57) ABSTRACT

A cup holder includes a main body that includes a recess-shaped cup housing portion for housing a cup, a light source arranged on a back surface of the main body and located under the cup housing portion, and a plate-shaped light guide lens placed on a bottom surface of the cup housing portion of the main body. The main body includes a first hole and a second hole on the bottom surface of the cup housing portion. The second hole is arranged to guide light emitted from the light source to the light guide lens, and the first hole is arranged to drain liquid inside the cup housing portion.

8 Claims, 8 Drawing Sheets

CUP HOLDER

BACKGROUND OF INVENTION

The present application is based on Japanese patent application Nos. 2017-179445 and 2018-015502 filed on Sep. 19, 2017 and Jan. 31, 2018, respectively, the entire contents of which are incorporated herein by reference.

1. Field of Invention

The invention relates to a cup holder, in particular, to a cup holder to be installed in an automobile, etc.

2. Related Art

A convenient cup holder is known which has a light source to improve visibility and decorativeness of a cup housing portion at night while a conventional cup holder is installed in, e.g., a console box or a front surface of an instrument panel inside an automobile to temporarily store beverage containers such as plastic bottle or beverage can (see, e.g., JP 2015/229455 A and US 2016/0046233 A).

The cup holders disclosed in JP 2015/229455 A and US 2016/0046233 A are provided with a cup housing portion for housing a cup, a light guide body attached to a bottom portion of the cup housing portion, and a light source emitting light to be supplied to the light guide body.

The cup holder disclosed in US 2016/0046233 A also has a channel and a drain port which are provided beneath the cup housing portion to drain liquid spilled inside the cup housing portion. By draining the liquid from the cup housing portion through the channel and the drain port, it is possible to prevent the liquid from penetrating to the light source through, e.g., a gap between the cup holder main body and the light guide body and thus possible to prevent damage on the light source caused by penetration of the liquid.

In the cup holders disclosed in US 2016/0046233 A, however, when a large amount of liquid is present inside the cup housing portion and flows into the channel, the liquid may pass beyond the channel and penetrate to the light source. In addition, there is a problem that the size of the cup holder is increased to provide the channel and the drain port.

SUMMARY OF INVENTION

It is an object of the invention to provide a cup holder that is constructed so as to effectively drain liquid inside a cup housing portion to prevent the liquid from penetrating to the light source without being increased in size.

According to an embodiment of the invention, a cup holder defined by [1] to [9] below can be provided.

[1] A cup holder, comprising:

a main body that comprises a recess-shaped cup housing portion for housing a cup;

a light source arranged on a back surface of the main body and located under the cup housing portion; and a plate-shaped light guide lens placed on a bottom surface of the cup housing portion of the main body, wherein the main body comprises a first hole and a second hole on the bottom surface of the cup housing portion, wherein the second hole is arranged to guide light emitted from the light source to the light guide lens, and wherein the first hole is arranged to drain liquid inside the cup housing portion.

[2] The cup holder according to [1], wherein the light guide lens comprises a protrusion formed on a surface facing the bottom surface of the cup housing portion, and wherein the first hole is arranged to receive the protrusion of the light guide lens to fix the light guide lens to the main body and to form a gap to communicate from the cup housing portion to the back surface when the protrusion of the light guide lens is received in the first hole.

[3] The cup holder according to [1] or [2], further comprising a mat placed on the light guide lens inside the cup housing portion, wherein the mat comprises a protrusion formed on a surface facing the light guide lens, wherein the light guide lens comprises a hole to receive the protrusion of the mat to fix the mat to the light guide lens, wherein the main body comprises a third hole formed on the bottom surface of the cup housing portion to avoid contact with the protrusion of the mat, and wherein the hole of the light guide lens and the third hole of the main body are arranged to form a gap to communicate from the cup housing portion to the back surface when the protrusion of the mat are received in the hole of the light guide lens so as to serve as a drain hole to drain liquid inside the cup housing portion.

[4] The cup holder according to [3], wherein the hole of the light guide lens has an arc shape at a portion on the light source side.

[5] The cup holder according to any one of [1] to [4], wherein the light guide lens is installed to decline to one of the first hole.

[6] The cup holder according to any one of [1] to [5], wherein the main body further comprises an annular protrusion formed on the back surface so as to surround the first hole.

[7] The cup holder according to any one of [1] to [6], wherein the main body further comprises a plurality of wall-shaped protrusions formed on the back surface so as to surround the second hole.

[8] The cup holder according to any one of [1] to [7], wherein the light source is installed to decline to a side of the connector.

[9] The cup holder according to [3] or [4], wherein the light guide lens further comprises a groove that reflects light entering the light guide lens through a light inlet portion to collect light emitted from the light source and that changes a travel direction of the light to a region of the edge of the light guide lens that is hidden behind the holes when viewed from the light inlet portion.

EFFECTS OF INVENTION

According to one embodiment of the invention, a cup holder can be provided that is constructed so as to effectively drain liquid inside a cup housing portion to prevent the liquid from penetrating to the light source without being increased in size.

BRIEF DESCRIPTION OF DRAWINGS

Next, the present invention will be explained in more detail in conjunction with appended drawings, wherein.

DESCRIPTION OF EMBODIMENTS

First Embodiment

Basic Configuration of Cup Holder

Figure 1:
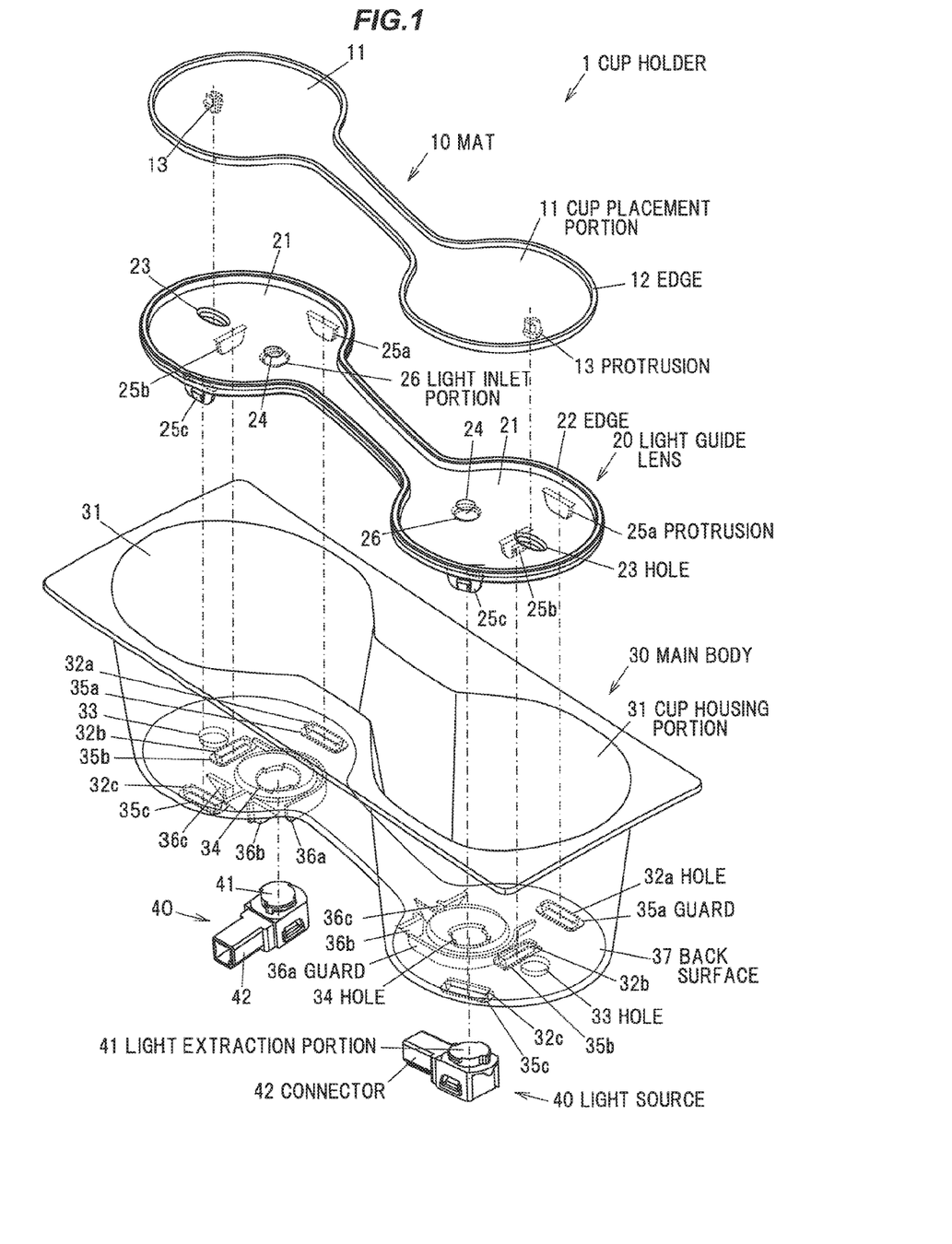
FIG. 1 is an exploded perspective view showing a cup holder in the first embodiment.
Figure 2:
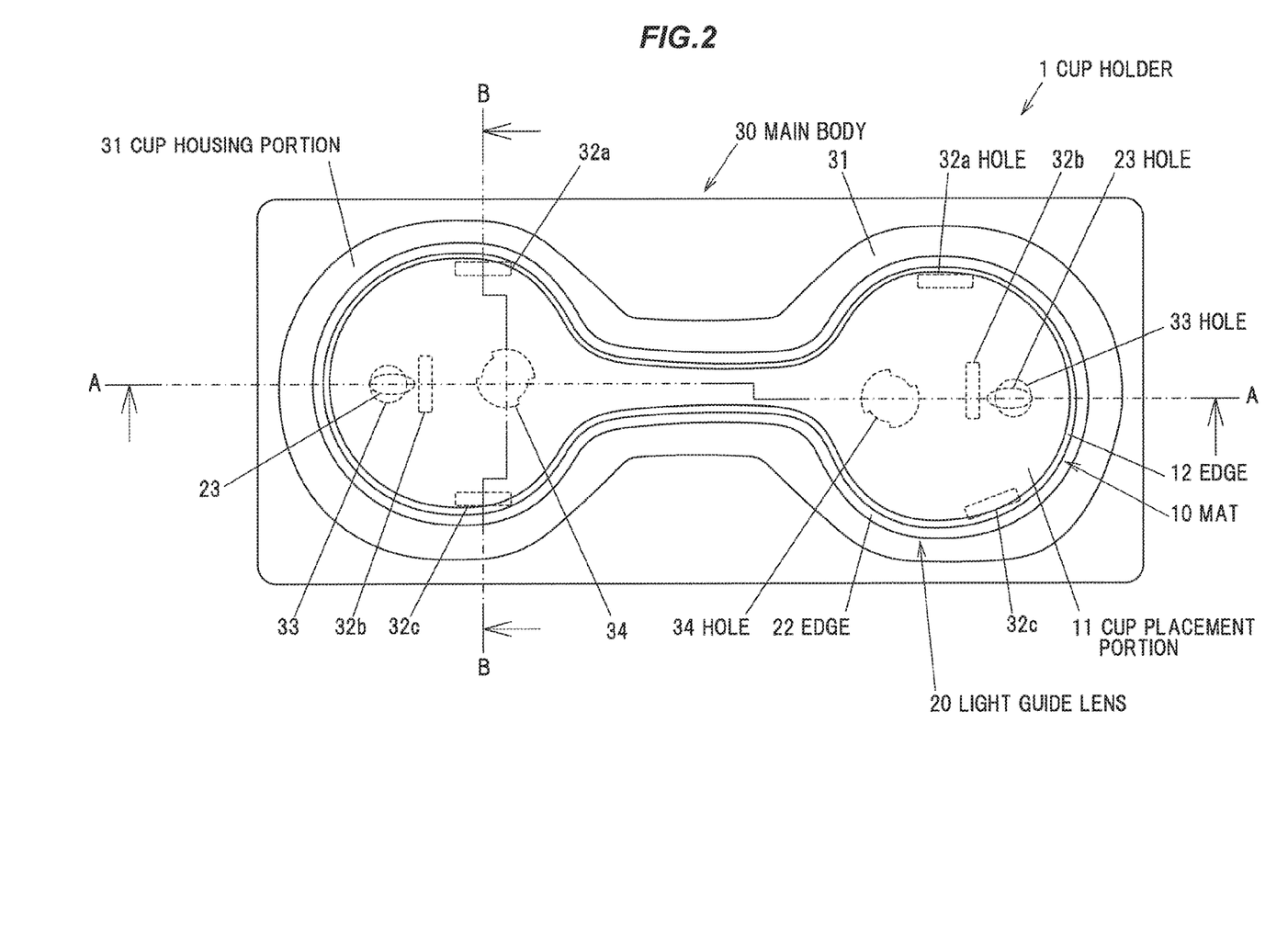
FIG. 2 is a top view showing the cup holder in the first embodiment.
Figure 3:
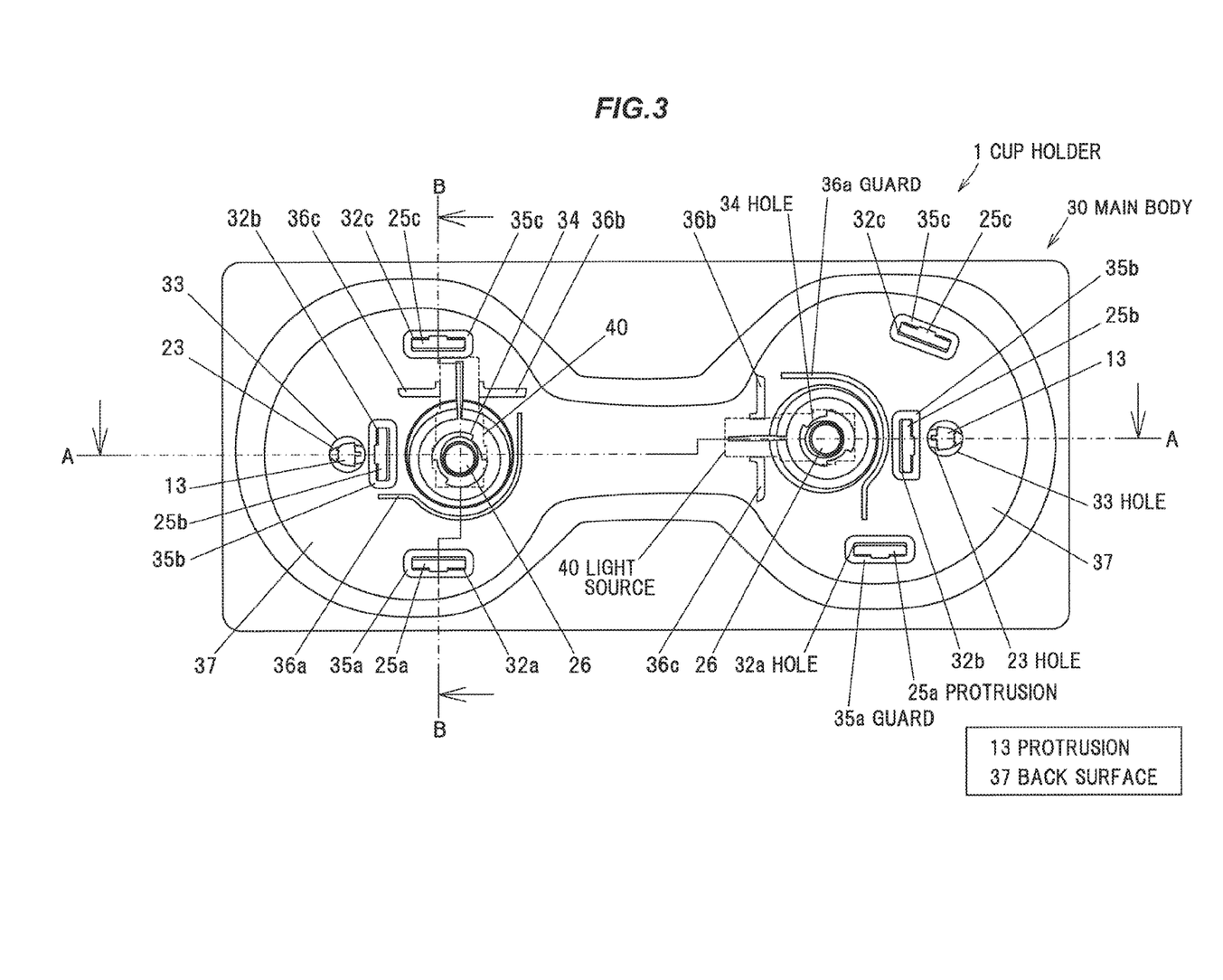
FIG. 3 is a bottom view showing the cup holder in the first embodiment.
Figure 4:
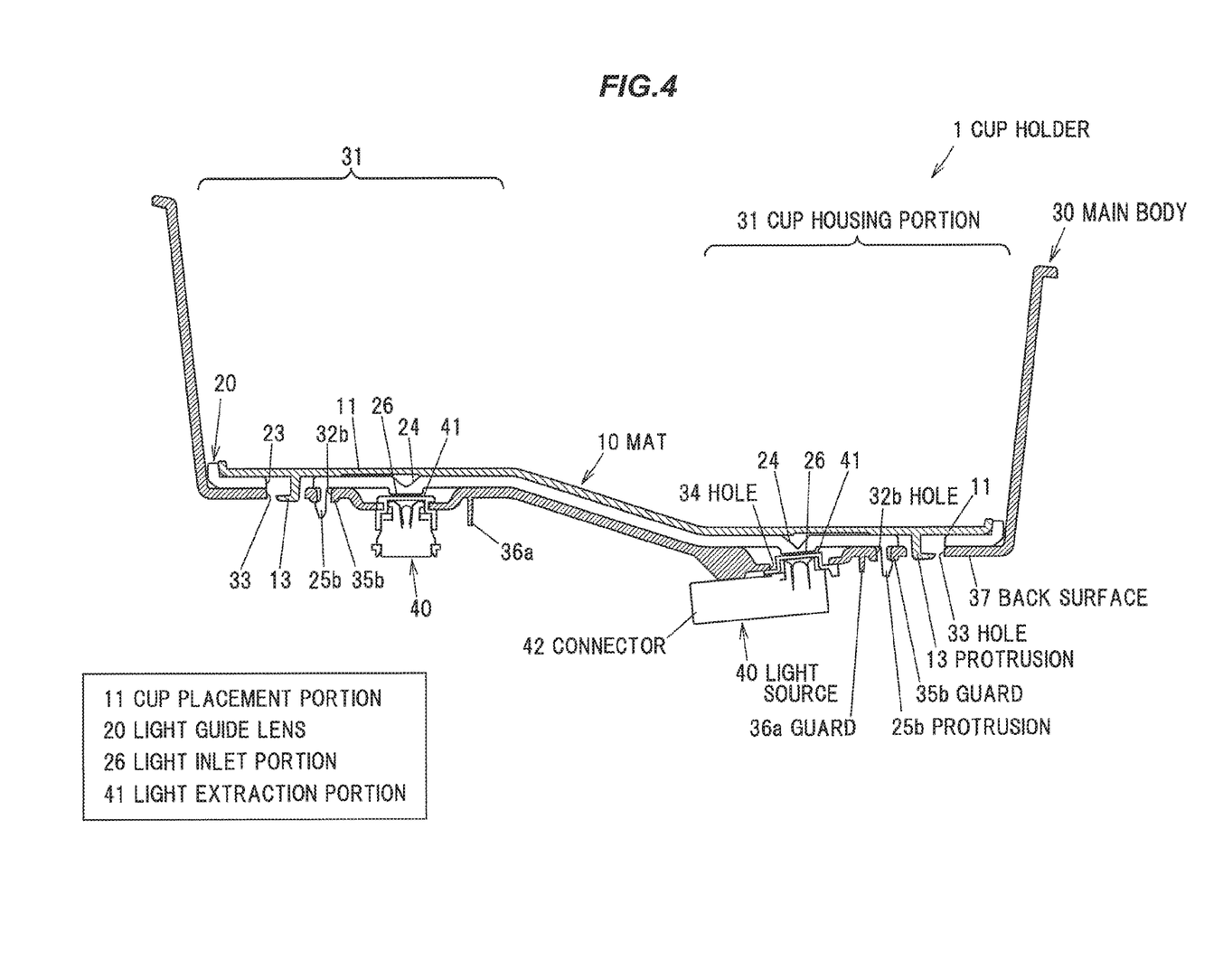
FIG. 4 is a vertical cross-sectional view showing the cup holder taken along a line A-A in FIGS. 2 and 3.
Figure 5:
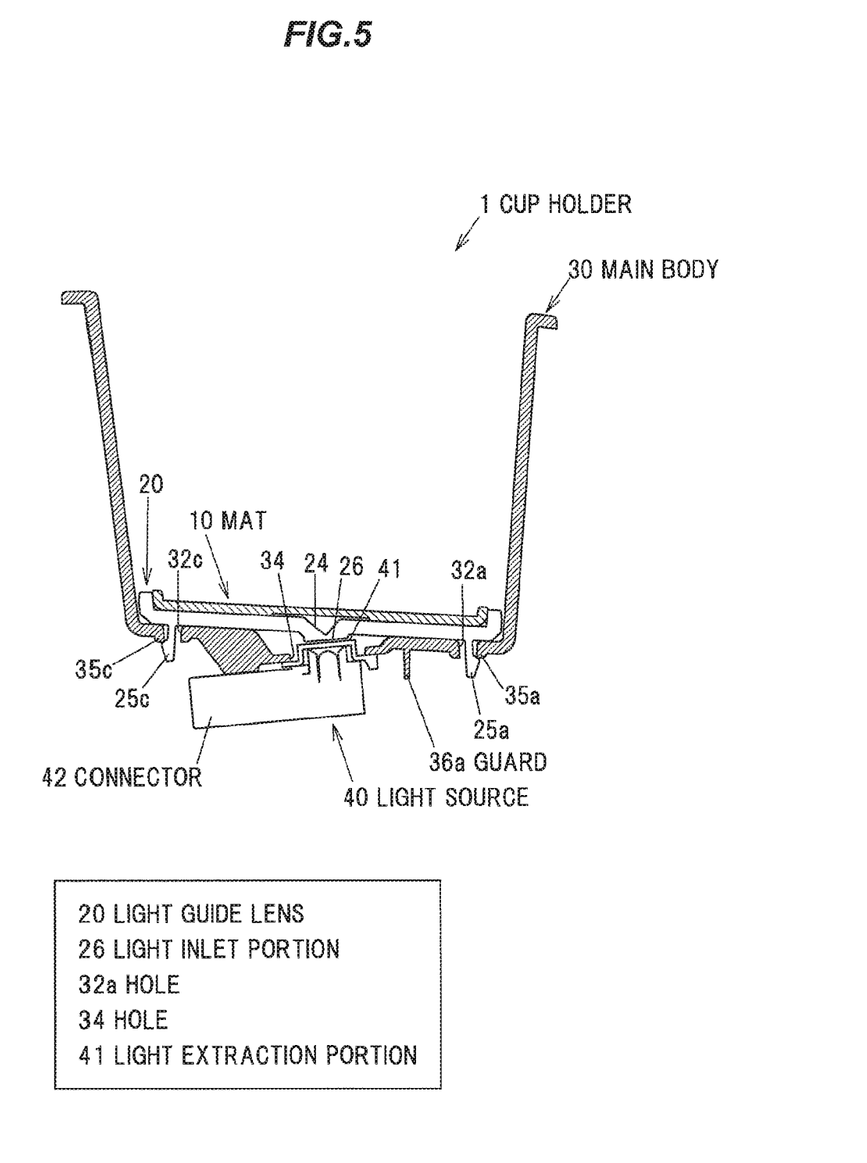
FIG. 5 is a vertical cross-sectional view showing the cup holder taken along a line B-B in FIGS. 2 and 3.

FIGS. 1, 2 and 3 are an exploded perspective view, a top view and a bottom view, respectively, showing a cup holder 1 in the first embodiment. FIG. 4 is a vertical cross-sectional view showing the cup holder 1 taken along the line A-A in FIGS. 2 and 3. FIG. 5 is a vertical cross-sectional view showing the cup holder 1 taken along the line B-B in FIGS. 2 and 3.

In FIG. 2, the positions of holes 23 of a light guide lens 20 and holes 32 (32a, 32b, 32c), holes 33 and holes 34 of a main body 30 (described later) are indicated by dotted lines. Meanwhile, in FIG. 3, light sources 40 (described later) are omitted but the positions thereof are indicated by dotted lines.

The cup holder 1 is provided with the main body 30 which has recess-shaped cup housing portions 31 for housing cups, the light sources 40 arranged on a back surface 37 of the main body 30 and located under the cup housing portions 31, the plate-shaped light guide lens 20 placed on bottom surfaces of the cup housing portions 31, and a mat 10 placed on the light guide lens 20 inside the cup housing portions 31.

The mat 10 is formed of an opaque material such as TPO (olefinic thermoplastic elastomer). The main body 30 is formed of an opaque material such as PP (polypropylene) or ABS (acrylonitrile-butadiene-styrene) resin. The mat 10 and the main body 30 are, e.g., black in color. The light guide lens 20 is formed of a transparent material such as PC (polycarbonate) or PMMA (polymethylmethacrylate) resin.

The cup housing portions 31 of the main body 30 can house beverage containers such as plastic bottles, beverage cans or cups. The main body 30 has two cup housing portions 31 in the first embodiment but may have one, or not less than three cup housing portions 31.

The mat 10 is placed inside the main body 30 so that a cup placement portion 11 receiving beverage containers thereon fits into the cup housing portions 31. The mat 10 is configured that the height of the cup placement portion 11 is smaller than the height of an edge 12.

The mat 10 has protrusions 13 formed on the back surface of the cup placement portion 11 facing the light guide lens 20. Meanwhile, the light guide lens 20 has the holes 23 in a region 21 located immediately below the cup placement portion 11. The mat 10 can be fixed to the light guide lens 20 by fitting the protrusions 13 of the mat 10 to the holes 23 of the light guide lens 20. Furthermore, the main body 30 has the holes 33 formed on the bottom surfaces of the cup housing portions 31 to avoid contact with the protrusions 13 of the mat 10. Each protrusion 13 has, e.g., a pawl as shown in FIGS. 1 and 3 to 5.

The light guide lens 20 has protrusions 25 (25a, 25b, 25c) which are provided in the region 21 located immediately below the cup placement portion 11 and formed on a surface facing the bottom surfaces of the cup housing portions 31. Meanwhile, the main body 30 has the hole 32 (32a, 32b, 32c) on the bottom surfaces of the cup housing portions 31.

The light guide lens 20 can be fixed to the main body 30 by fitting the protrusions 25 of the light guide lens 20 to the hole 32 of the main body 30. Each protrusion 25 has, e.g., a pawl as shown in FIGS. 1 and 3 to 5.

The light guide lens 20 is configured that the height of an edge 22 is greater than the height of a region inside the edge 22. The mat 10 is placed on the light guide lens 20 so as to fit inside the edge 22. Thus, the edge 22 of the light guide lens 20 is not covered with the mat 10 and is exposed inside the cup housing portions 31.

Configuration and Effects of Illuminating Cup Housing Portion

In the cup holder 1, light emitted from the light source 40 propagates through the light guide lens 20 and exits from the exposed portion of the light guide lens 20 into the cup housing portions 31, thereby improving visibility and decorativeness of cup housing portions at night.

The main body 30 has the holes 34 on the bottom surfaces of the cup housing portions 31. The hole 34 is a hole for guiding light emitted from the light source 40 to the light guide lens 20. Due to having the holes 34, the light emitted from the light source 40 enters the light guide lens 20 without being blocked by the main body 30.

In the first embodiment, a light extraction portion 41 of the light source 40 is fitted to the hole 34 and faces a light inlet portion 26 which is a substantially columnar protrusion provided on a surface of the light guide lens 20 facing the bottom surfaces of the cup housing portions 31. The light emitted from the light extraction portion 41 of the light source 40 and entering the light guide lens 20 through the light inlet portions 26 is reflected by inclined surfaces of substantially conical recesses 24 located immediately above the light inlet portions 26 of the light guide lens 20 and propagates through the light guide lens 20 in an in-plane direction.

The light propagating through the light guide lens 20 exits into the cup housing portions 31 through the edge 22 which is an exposed portion of the light guide lens 20 not covered with the mat 10.

Figure 6:
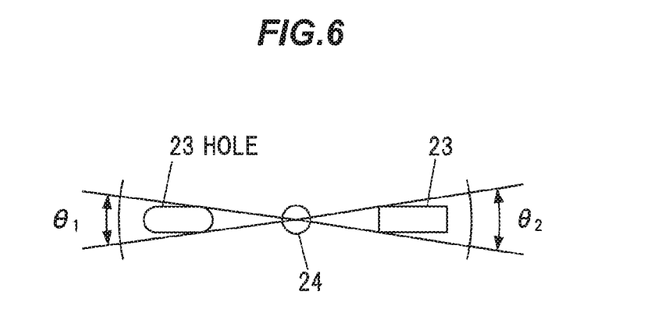
FIG. 6 is a conceptual diagram illustrating a relation between a shape of a hole on a light guide lens and a size of a shaded region formed by the hole.

FIG. 6 is a conceptual diagram illustrating a relation between a shape of the hole 23 on the light guide lens 20 and a size of a shaded region formed by the hole 23. As described above, the light entering the light guide lens 20 is reflected by the inclined surfaces of the recesses 24 and propagates through the light guide lens 20 in an in-plane direction. At this time, shaded regions are formed due to the holes 23. The smaller the shaded region formed by the holes 23, the better it is for improving distribution uniformity of intensity of the light exiting from the edge 22.

In FIG. 6, $\theta_1$ is an angle of the shaded region formed by the hole 23 with rounded corners and $\theta_2$ is an angle of the shaded region formed by the hole 23 with non-rounded corners. As shown in FIG. 6, $\theta_1$ is smaller than $\theta_2$ and the shaded region formed when rounding the corners of the hole 23 is smaller than that when not rounding the corners of the hole 23.

Therefore, the hole 23 is preferably formed so that at least a portion on the recess 24 side (the light source 40 side) has an arc shape. The hole 23 preferably has, e.g., an ellipse shape as shown in FIGS. 1 and 2.

Configuration and Effects of Protecting Light Source from Liquid

Figure 7A:
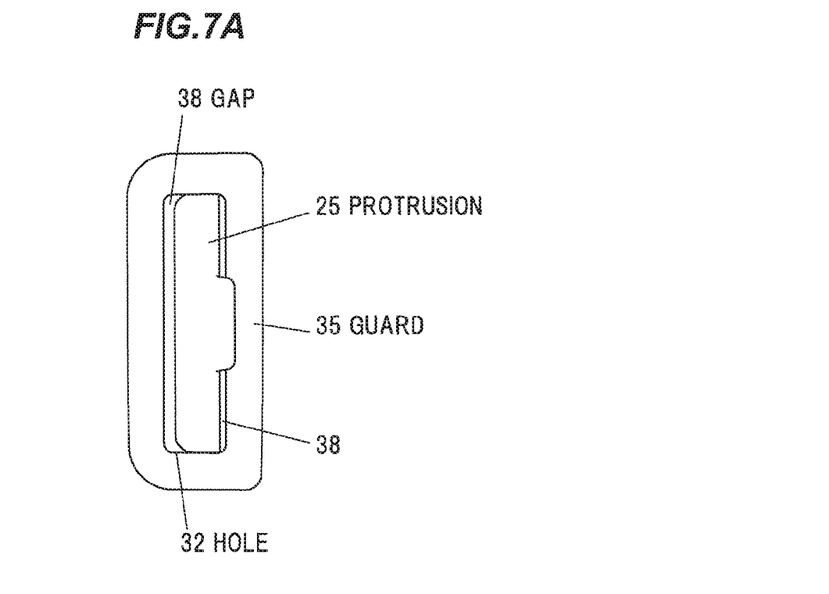
FIGS. 7A and 7B are enlarged bottom views of the cup holder showing the periphery of the holes of the main body.
Figure 7B:
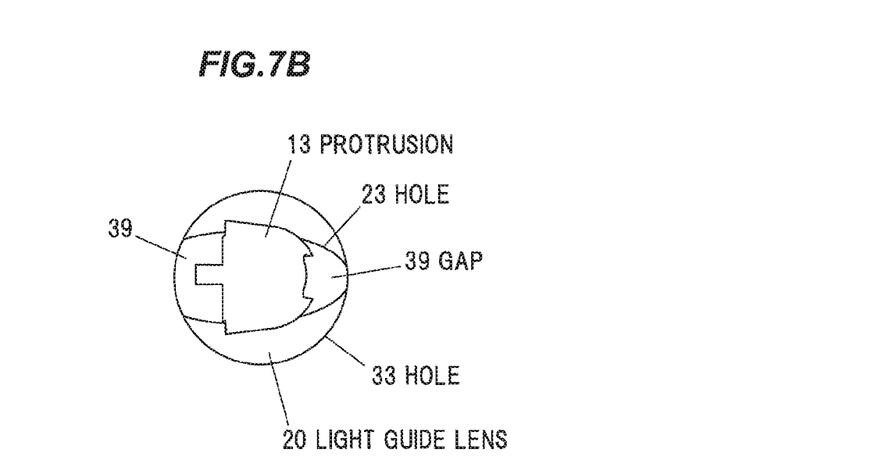

FIGS. 7A and 7B are each enlarged bottom views of the cup holder 1 showing the periphery of the hole 32 and the periphery of the hole 33 of the main body 30.

As shown in FIG. 7A, the hole 32 (32a, 32b, 32c) of the main body 30 is configured that a continuous gap 38 is formed to penetrate the main body 30 from the cup housing portion 31 to the back surface 37 when the protrusion 25 (25a, 25b, 25c) of the light guide lens 20 is fitted, and the hole 32 thereby serves as a drain hole for draining liquid inside the cup housing portion 31.

Meanwhile, as shown in FIG. 7B, the hole 23 of the light guide lens 20 and the hole 33 of the main body 30 are configured that a continuous gap 39 is formed to penetrate the main body 30 from the cup housing portion 31 to the back surface 37 when the protrusion 13 of the mat 10 is fitted to the hole 23 of the light guide lens 20, and the hole 23 and the hole 33 thereby serve as a drain hole for draining liquid inside the cup housing portion 31.

Liquid spilled into the cup housing portion 31 and entering a gap between the mat 10 and the light guide lens 20 can be drained through the gap 39 to the outside of the cup holder 1. Meanwhile, liquid spilled into the cup housing portion 31 and entering a gap between the light guide lens 20 and the main body 30 can be drained through the gaps 38 and 39 to the outside of the cup holder 1.

By draining liquid in the cup housing portions 31 through the holes 23, 32 and 33 in such a manner, it is possible to prevent liquid from penetrating to the light sources 40 through the holes 34 of the main body 30. As a result, damage on the light sources 40 due to ingress of liquid can be prevented.

In addition, in the cup holder 1, the holes 23, 32 and 33 used for fixing each member can be also used to drain liquid from the cup housing portions 31. Therefore, it is possible to suppress an increase in size as compared to when providing a dedicated drain hole.

In addition, since the liquid drained from the cup housing portions 31 through the holes 23, 32 and 33 is likely to trickle down along the protrusions 13 and 25, it is possible to effectively prevent the liquid from penetrating to the light sources 40.

Meanwhile, as shown in FIG. 5, the light guide lens 20 is downwardly inclined toward the holes 32a among the holes 32 of the main body 30. Therefore, the liquid inside the cup housing portions 31 can easily flow into the hole 32 and can be efficiently drained out.

The main body 30 also has guards 35 (35a, 35b, 35c) which are annular protrusions surrounding the holes 32 (32a, 32b, 32c) and are formed on the back surface 37. Since the guards 35 are provided, the liquid drained from the cup housing portions 31 through the holes 32 is likely to trickle down along the guards 35 and it is possible to prevent the liquid from penetrating to the light source 40 more effectively. The guard 35 preferably has a continuous annular shape but may be a discontinuous annular shape.

In addition, the main body 30 also has guards 36 (36a, 36b, 36c) which are wall-shaped protrusions arranged to surround the holes 34 and are formed on the back surface 37. The guards 36 are positioned closer to the light sources 40 (the holes 34) than the holes 23, 32 and 33 which are located out of the regions surrounded by the guards 36 (36a, 36b, 36c). By providing the guards 36, the liquid drained from the cup housing portions 31 through the holes 23, 32 and 33 and running along the back surface 37 is prevented from penetrating to the light source 40.

The light source 40 is downwardly inclined toward a connector 42 so that the connector 42 side is lower than the light extraction portion. Thus, liquid running along the surface of the light source 40 can be prevented from entering the inside of the light source 40 through the connector 42.

Modification

Figure 8:
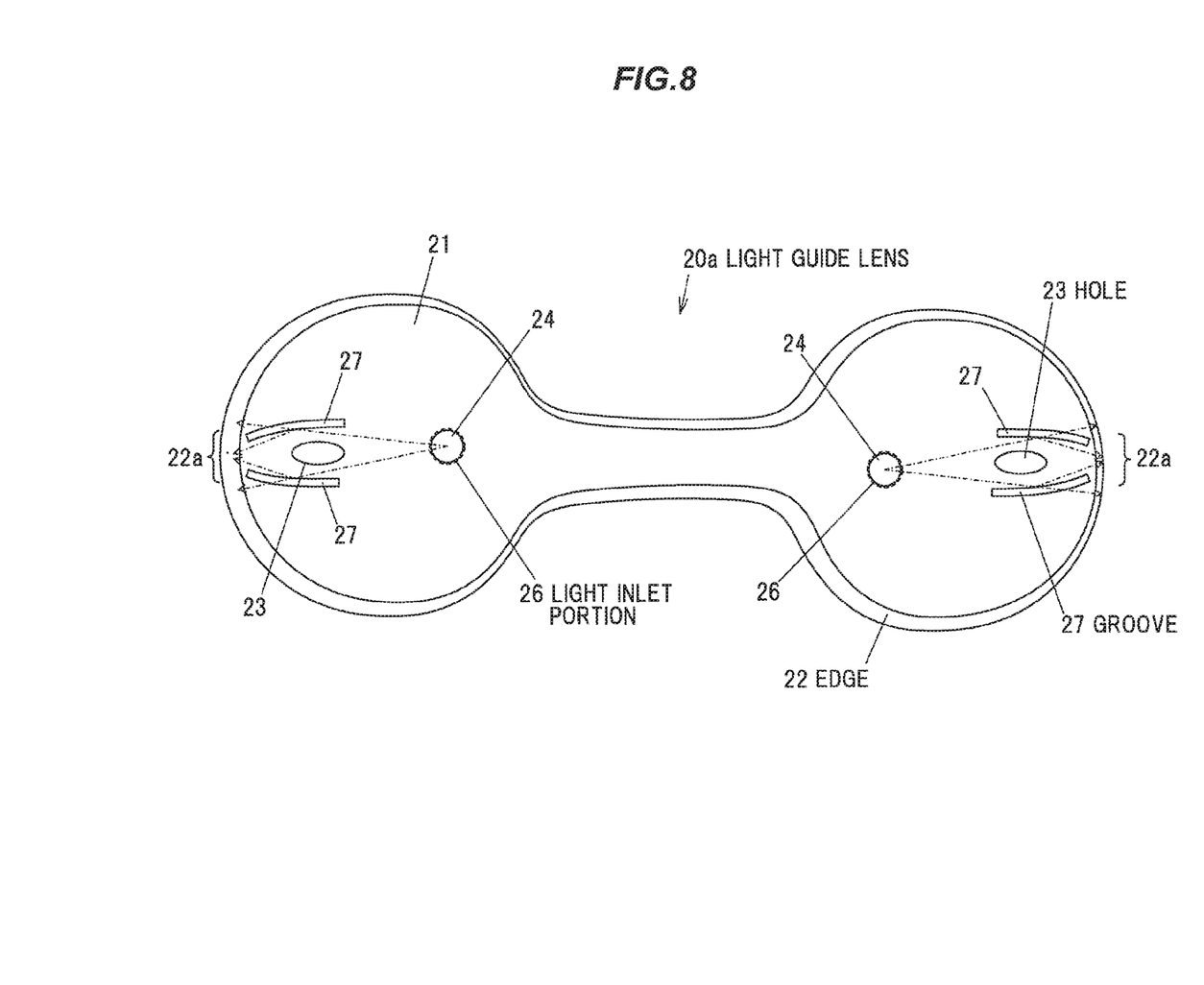
FIG. 8 is a top view showing a modification of the light guide lens.

FIG. 8 is a top view showing a light guide lens 20a which is a modification of the light guide lens 20. The light guide lens 20a has grooves 27 for improving brightness of regions 22a of the edge 22. Each region 22a of the edge 22 is a region which is located on the opposite side to the light inlet portion 26 when viewing from the hole 23 and has less brightness than the other region of the edge 22 by being hidden behind the hole 23 when viewing from the light inlet portion 26.

Light entering the light guide lens 20a from the light inlet portion 26 is incident on and reflected by the grooves 27, changes its travel direction at the grooves 27 and travels toward the regions 22a. Thus, brightness in the regions 22a is improved and a difference in brightness between the regions 22a and the other region of the edge 22 thus can be reduced or substantially eliminated.

The groove 27 is, e.g., a groove having a linear shape in plan view and extending in a direction similar to a direction of a straight line connecting the light inlet portion 26 to the hole 23, and is provided at a position aligned with the hole 23 in a direction orthogonal to the straight line connecting the light inlet portion 26 to the hole 23. To efficiently direct the reflected light toward the region 22a, the shape of the groove 27 in plan view is preferably slightly curved toward the hole 23 as shown in FIG. 8. In addition, to efficiently improve brightness of the regions 22a, it is preferable to provide the grooves 27 on both sides of the hole 23 in a direction perpendicular to the straight line connecting the light inlet portion 26 to the hole 23, as shown in FIG. 8.

In addition, the groove 27 is a non-through groove not penetrating the light guide lens 20a in a thickness direction. Thus, light passing through the light guide lens 20a under the grooves 27 is not reflected by the grooves 27 and it is possible to suppress a decrease in brightness of the region hidden behind the grooves 27 when viewed from the light inlet portion 26. The depth of the groove 27 is appropriately determined according to desired brightness of the region 22a and brightness of the region hidden behind the grooves 27 when viewed from the light inlet portion 26. The groove 27 typically opens on the front surface of the light guide lens 20a but may be open on the back surface.

Effects of the Embodiments

According to the embodiments, it is possible to provide a cup holder having a structure which allows liquid inside a cup housing portion to be effectively drained without increasing the size and thereby prevents the liquid from penetrating to a light source.

Although the embodiments of the invention have been described, the invention is not intended to be limited to the embodiments, and the various kinds of modifications can be implemented without departing from the gist of the invention.

In addition, the invention according to claims is not to be limited to the embodiments. Further, please note that all combinations of the features described in the embodiments are not necessary to solve the problem of the invention.

The invention claimed is:

1. A cup holder, comprising:
    a main body that comprises a recess-shaped cup housing portion for housing a cup;
    a light source arranged on a back surface of the main body and located under the cup housing portion;
    a plate-shaped light guide lens placed on a bottom surface of the cup housing portion of the main body; and
    a mat placed on the light guide lens inside the cup housing portion, wherein the main body comprises a first hole and a second hole on the bottom surface of the cup housing portion, wherein the second hole is arranged to guide light emitted from the light source to the light guide lens, wherein the first hole is arranged to drain liquid inside the cup housing portion, wherein the mat comprises a protrusion formed on a surface facing the light guide lens, wherein the light guide lens comprises a hole to receive the protrusion of the mat to fix the mat to the light guide lens, wherein the main body further comprises a third hole formed on the bottom surface of the cup housing portion to avoid contact with the protrusion of the mat, and wherein the hole of the light guide lens and the third hole of the main body are arranged to form a gap to communicate from the cup housing portion to the back surface when the protrusion of the mat are received in the hole of the light guide lens as to serve as a drain hole to drain liquid inside the cup housing portion.

2. The cup holder according to claim 1, wherein the light guide lens comprises a protrusion formed on a surface facing the bottom surface of the cup housing portion, and wherein the first hole is arranged to receive the protrusion of the light guide lens to fix the light guide lens to the main body and tip form a gap to communicate from the cup housing portion to the back surface when the protrusion of the light guide lens is received in the first hole.

3. The cup holder according to claim 1, wherein the hole of the light guide lens has an arc shape at a portion on a light source side.

4. The cup holder according to claim 1, wherein the light guide lens inclines toward the first hole.

5. The cup holder according to claim 1, wherein the main body further comprises an annular protrusion formed on the back surface so as to surround the first hole.

6. The cup holder according to claim 1, wherein the main body further comprises a plurality of wall-shaped protrusions formed on the back surface so as to surround the second hole.

7. The cup holder according to claim 1, wherein the light source inclines on a side of a connector of the light source.

8. The cup holder according to claim 1, wherein the light guide lens further comprises a groove that reflects light entering the light guide lens through a light inlet portion to collect light emitted from the light source and that changes a travel direction of the light to a region of an edge of the light guide lens that is hidden behind the holes when viewed from the light inlet portion.

* * * * *